(12) United States Patent
Bagnall et al.

(10) Patent No.: US 8,028,467 B2
(45) Date of Patent: Oct. 4, 2011

(54) LIVE INSECT TRAP

(75) Inventors: Gary Wayne Bagnall, Arroyo Grande, CA (US); Mark H. Rose, Newhall, CA (US)

(73) Assignee: Zoo Med Laboratories, Inc., San Luis Obispo, CA (US)

( * ) Notice: Subject to any disclaimer, the term of this patent is extended or adjusted under 35 U.S.C. 154(b) by 1813 days.

(21) Appl. No.: 10/759,585

(22) Filed: Jan. 15, 2004

(65) Prior Publication Data

US 2005/0155277 A1    Jul. 21, 2005

(51) Int. Cl.
*A01M 1/04* (2006.01)
*A01M 1/10* (2006.01)
(52) U.S. Cl. ............................ 43/113; 43/107; 43/122
(58) Field of Classification Search ............... 43/113, 43/107, 122
See application file for complete search history.

(56) References Cited

U.S. PATENT DOCUMENTS

| | | | | | |
|---|---|---|---|---|---|
| 1,037,688 | A | * | 9/1912 | Troth | 43/113 |
| 1,168,798 | A | * | 1/1916 | Glass | 43/141 |
| 1,445,906 | A | * | 2/1923 | Noonan | 43/113 |
| 1,482,420 | A | * | 2/1924 | Wilson | 43/113 |
| 3,465,468 | A | * | 9/1969 | Takamoto | 43/113 |
| 4,788,789 | A | * | 12/1988 | Boobar et al. | 43/113 |
| 5,274,949 | A | * | 1/1994 | Beaton | 43/113 |
| 5,363,589 | A | * | 11/1994 | Flynn | 43/122 |
| 5,522,173 | A | | 6/1996 | Muhlinghaus | |
| 6,134,826 | A | * | 10/2000 | Mah | 43/112 |

OTHER PUBLICATIONS

Flyer for Wild Food Critter Catchers, Phoenix, Arizona, United States of America, published on or prior to Nov. 4, 1997.

* cited by examiner

*Primary Examiner* — Darren W Ark
(74) *Attorney, Agent, or Firm* — Mitchell Silberberg & Knupp, LLP

(57) ABSTRACT

Provided is an apparatus for capturing live insects that includes an upper section having side walls, a top cover, and plural openings in the side walls that are large enough to permit insects to enter. This upper portion houses a light source and is well-suited to attracting and trapping insects in the first instance. An enclosed lower section is well-suited to trapping the insects on a more permanent basis. Between the upper section and the enclosed lower section is a funnel, having a wide opening adjacent to the upper section and tapering to a narrow opening within the lower section.

22 Claims, 4 Drawing Sheets

LIVE INSECT TRAP

BACKGROUND OF THE INVENTION

1. Field of the Invention

The present invention pertains to apparatuses for trapping live insects, e.g., for scientific study or for feeding to reptiles.

2. Description of the Related Art

Many different types of insect traps currently are available. However, most of such traps are designed to kill the insects (e.g., using electrocution), or else use a very sticky material to prevent the insects from escaping. As a result, such conventional insect traps typically do not provide live, healthy, usable insects.

One conventional trap that was intended to capture live insects was the "Wild Food Critter Catchers", which at least at one time was sold by James and Laura Sturgess of Phoenix Ariz. This conventional "trap" apparently consisted merely of a funnel attached to a jar, together with a string for hanging the assembly from a porch light, and simply relied upon insects falling into the top of the funnel and then becoming trapped within the jar. As a result, it is not believed to have been very efficient at capturing live insects.

SUMMARY OF THE INVENTION

The present invention arises out of the inventors' recognition that a more efficient device for capturing live, healthy, usable insects would be advantageous. The invention then addresses this need by providing a specially configured two-section insect trap having a funnel disposed between the upper and lower sections.

Thus, in one aspect the invention is directed to an apparatus for capturing live insects that includes an upper section having side walls, a top cover, and plural openings in the side walls that are large enough to permit insects to enter. This upper portion houses a light source and is well-suited to attracting and trapping insects in the first instance. An enclosed lower section is well-suited to trapping the insects on a more permanent basis. Between the upper section and the enclosed lower section is a funnel, having a wide opening adjacent to the upper section and tapering to a narrow opening within the lower section.

In use, insects are attracted to the light source within the upper section, eventually fall through the funnel into the enclosed lower section and then are more permanently trapped in the enclosed lower section, as the only escape typically is through the relatively small narrow opening in the funnel. In order to further reduce the likelihood of the insects finding this narrow opening, it is preferable to use a transparent, or at least optically transmissive, funnel. In this way, the light seen by the insects trapped in the enclosed lower section is fairly uniform, thereby avoiding drawing attention to the opening.

Further refinements on this structure can provide enhanced operation. For example, by making the inner surface of the side walls of the upper section reflective (or, more preferably, highly reflective), insects are more likely to become disoriented and trapped within the upper section of the apparatus until they ultimately collide with the light source or the walls or until they tire, in either case causing them to fall through the funnel into the enclosed lower section. Such surfaces might, for example, be white (or, more preferably, bright white), very light in color or specularly reflective.

By constructing the apparatus such that the wide opening of the funnel forms substantially all of the bottom surface of the upper section when the apparatus is fully assembled and/or by tapering the funnel walls steeply enough (e.g., at least 45° from horizontal), the insects are more likely to fall all the way into the enclosed lower section when they attempt to rest on, or when they fall to, the bottom of the upper section.

In the preferred embodiment of the invention, the enclosed lower portion can be easily removed from the upper portion and then covered. Such an arrangement generally will facilitate the transportation and subsequent removal of the trapped insects.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

Figure 1:
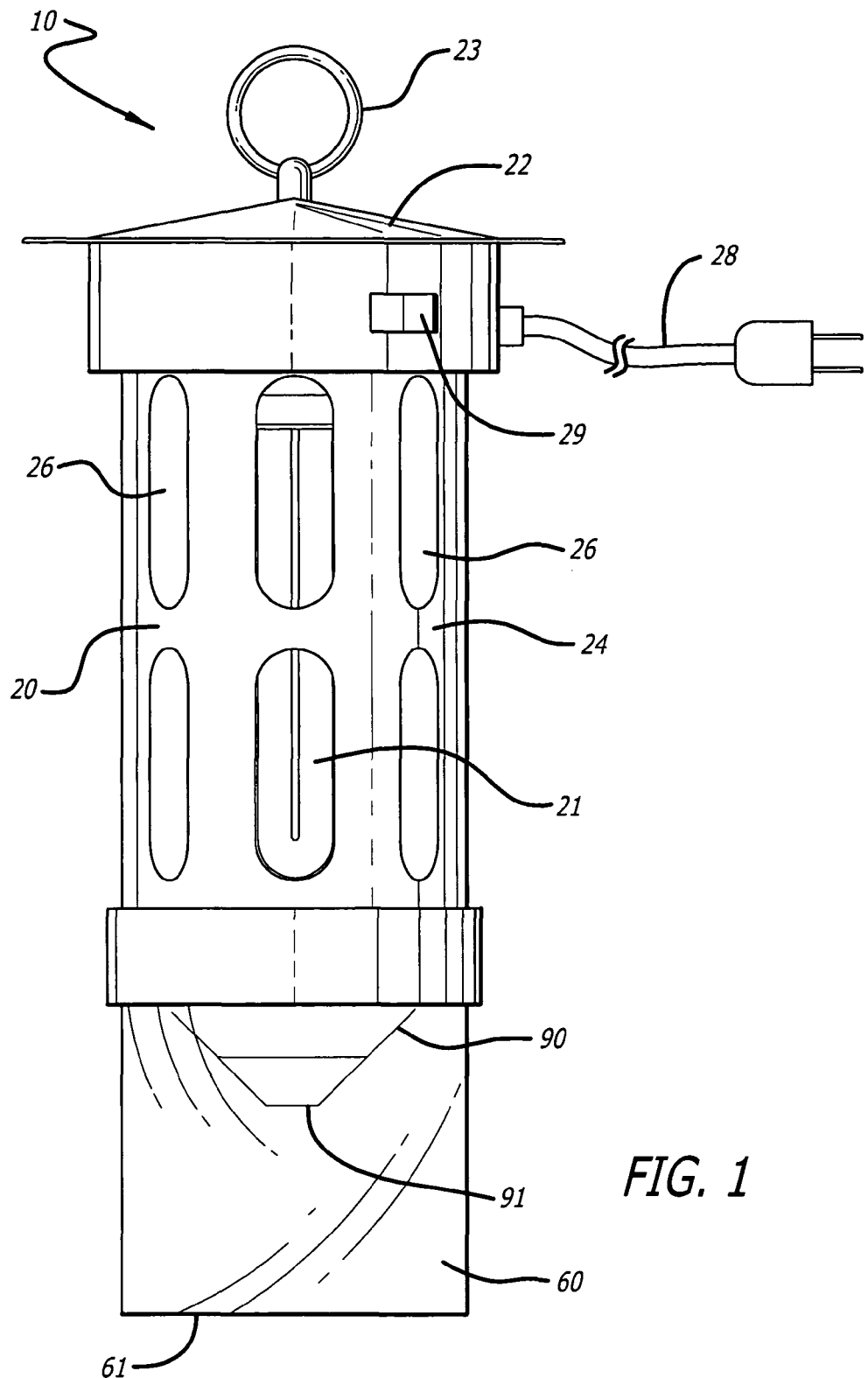
FIG. 1 is a front elevational view of a live insect trap according to the preferred embodiment of the present invention.
Figure 2:
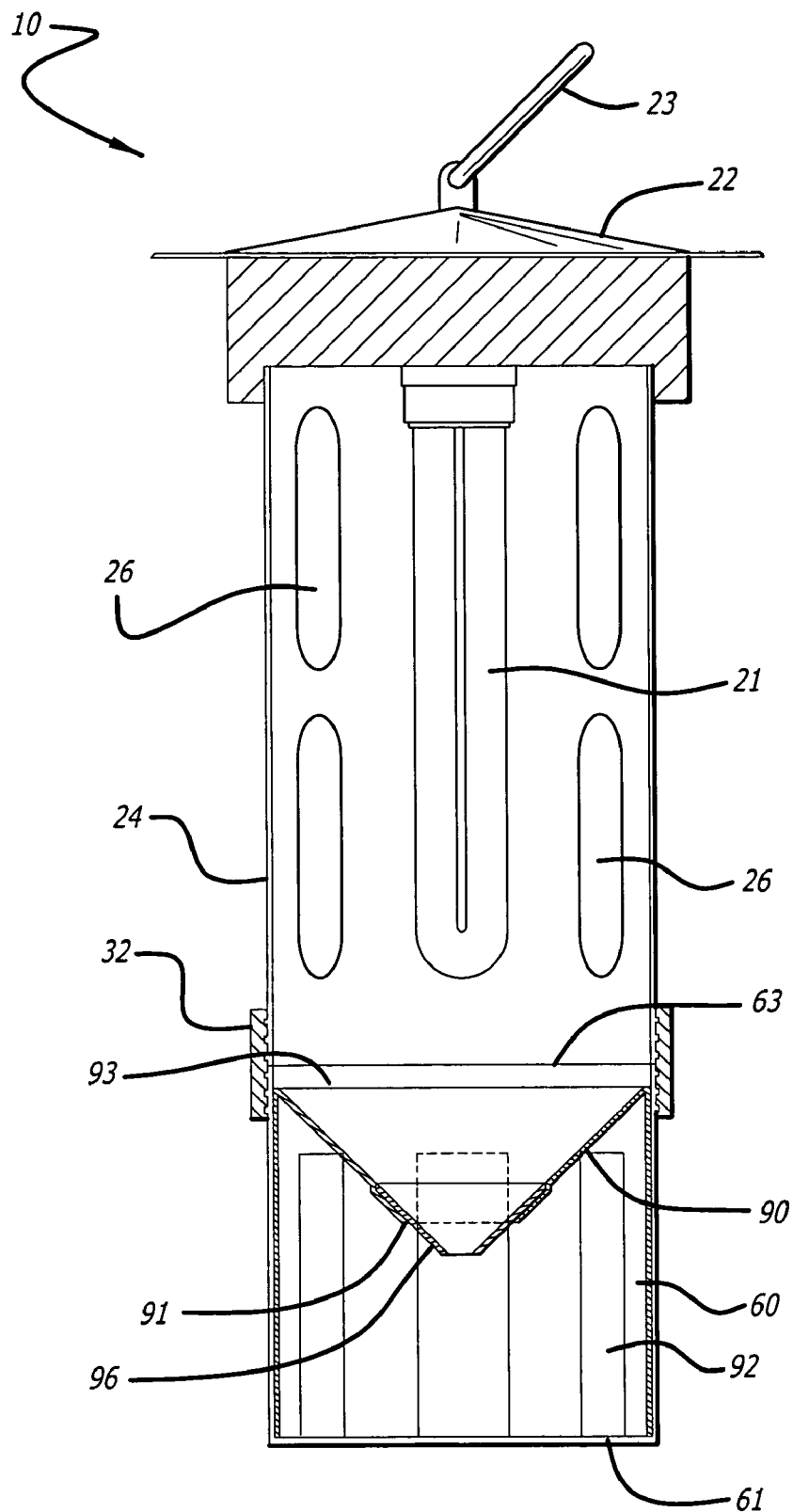
FIG. 2 is a vertical cross-sectional view of the live insect trap shown in FIG. 1.

FIGS. 1 and 2 illustrate a front elevational and a cross-sectional view, respectively, of a live insect trap 10 according to the preferred embodiment of the present invention. As shown in these figures, trap 10 includes an upper section 20, an enclosed lower section 60 and a funnel 90 in between. Within upper section 20 is a light source 21.

Upper section 20 provides a partial enclosure, having a top cover 22 and side walls 24, but with multiple openings 26 in the side walls 24 for allowing insects to enter. Also, as discussed in more detail below, an opening is provided by funnel 90 into the otherwise enclosed lower section 60. In the preferred embodiment of the invention, all of the openings 26 are provided in the side walls 24 of the upper section 20, and the top cover 22 is completely closed (i.e., no openings). However, in alternate embodiments openings 26 may also (or instead) be provided in top cover 22.

In the present embodiment of the invention, upper section 20 generally is cylindrically shaped with an essentially disk-shaped top cover 22. Provided on cover 22 is a ring 23 for hanging device 10, for example, with the use of a rope, string or chain (not shown). In the present embodiment, cover 22 is larger in diameter than the main body of upper section 20. However, this is not critical to the design.

Preferably, the exteriors of top cover 22 and side walls 24 are dark, such as by being entirely or principally black or some other dark color. Also, in the preferred embodiment of the invention, the interior surfaces of the top cover 22 and side walls 24 are reflective, such as by being entirely or principally white (or, more preferably, bright white) in color. However, such inner surfaces instead may be any other preferably light color, or even specularly reflective (e.g., mirrored).

The openings 26 preferably are sized sufficiently to permit the desired insects to pass easily into the interior of upper section 20. At the same time, it is desirable to have a sufficient amount of side wall area to prevent insects from easily escaping once inside upper section 20. Accordingly, the surface area of the side walls 24 that is the omitted to create openings 26 preferably is in the range of approximately 30-40% of the total area that would be provided if side walls 24 were completely closed.

In the illustrated embodiment, the openings 26 are formed as an array of vertical slots, with two rows of equally spaced slots extending around the circumference of upper section 20. More specifically, the vertical slots in the present embodiment are approximately ¾ inch in width and 2¾ inch in length and have the illustrated oval shape. This general configuration of openings 26 typically is preferred where the light source 21 also has a vertical configuration. However, any other arrangement, size and/or shape of the openings 26 may instead be used.

In the present embodiment of the invention, light source 21 is configured as a U-shaped florescent light that simply plugs into a receptacle in top cover 22. Such a light source is preferable over an incandescent lamp to achieve better energy-efficiency and lower temperature operation. In still further embodiments of the invention, an ultraviolet light source may instead be used. A power cord 28 supplies power to device 10 and the operation of light source 21 is controlled via on/off switch 29.

Both the enclosed bottom section 60 and the funnel 90 preferably are made from a clear (i.e., substantially transparent) plastic. However, they may instead be translucent, or otherwise substantially transmissive of light, or even substantially opaque, although (as discussed below) it is preferred that at least funnel 90 is substantially transmissive of light.

The enclosed bottom section 60 preferably is formed as a cylinder having a closed bottom 61 and an open top 63, with the top 63 attaching to the bottom of the upper section 20, e.g., in the manner described below. The functional part of funnel 90 is shaped identically to a conventional funnel, i.e., as a truncated cone, with the smaller opening 91 extending into enclosed bottom section 60 and the larger opening 93 roughly coinciding with the top opening 63 of enclosed bottom section 60. In the present embodiment, funnel 90 tapers from a larger opening 93 of approximately 4 inches to a smaller opening 91 of approximately one inch. In any event, the diameter of larger opening 93 preferably matches the inner diameter of both upper section 20 and lower section 60. As shown in FIG. 2 and discussed in more detail below, an appropriate insert 96 may be disposed within funnel 90 in order to reduce the size of opening 91 to a desired size.

Figure 3:
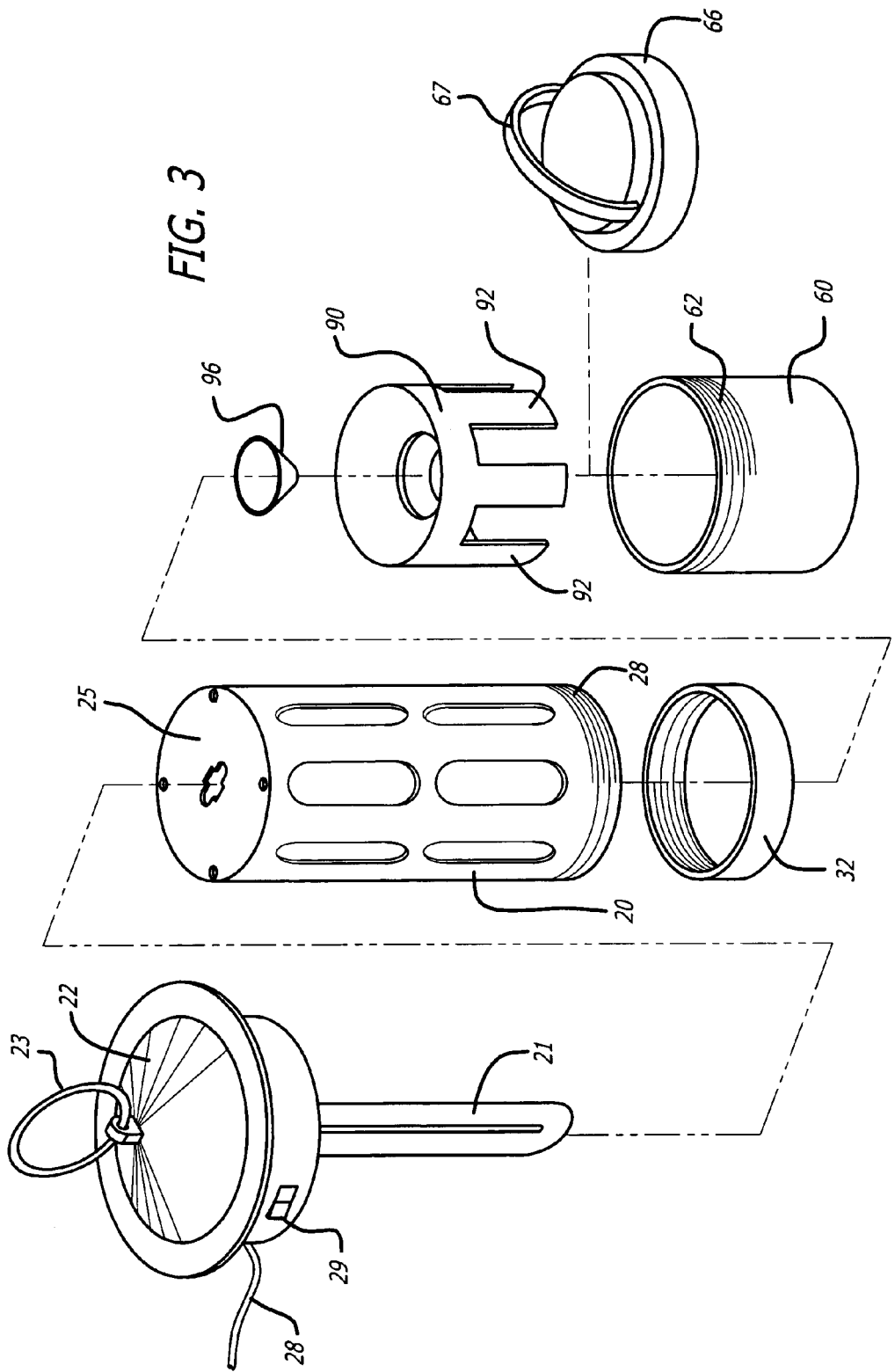
FIG. 3 is an exploded perspective view of the live insect trap shown in FIGS. 1 and 2.
Figure 4:
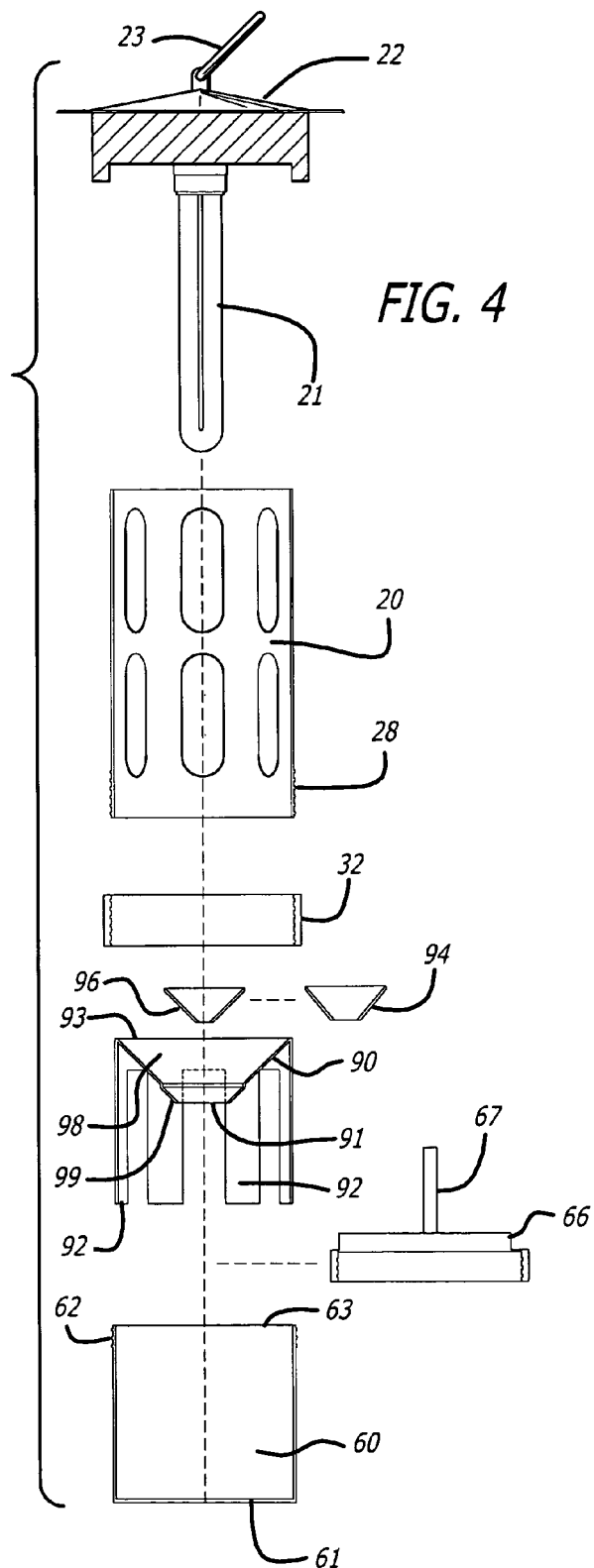
FIG. 4 is an exploded front elevational view of the live insect trap shown in FIGS. 1 and 2.

FIG. 3 illustrates an exploded perspective view of device 10 and FIG. 4 illustrates an exploded front elevational view of device 10, showing the assembly of device 10. Cover 22 preferably is detachable from upper section 20, such as by using four machine screws (not shown) to attach the top surface 25 of upper section 20 to cover assembly 22. Upper section 20 also includes an outer-threaded portion 28 that mates with inner-threaded ring 32, and lower section 60 includes a matching outer-threaded portion 62 that also screws into inner-threaded ring 32. In this manner, lower section 60 can be detachably attached to upper section 20. Alternatively, any other device may be used to achieve this result, such as by permanently attaching ring 32 to upper section 20 or simply including outer threads on the bottom of upper section 20 and inner threads on the top of lower section 60. In any event, it is preferable that lower section 60 can be easily and reliably detached from, and attached to, upper section 20; the use of mating threads is the currently preferred mechanism for permitting this. When lower section 60 is not attached to upper section 20 a cover 66 (which preferably has inner threads and includes a handle 67) may be attached to (e.g., screwed onto) lower section 60.

Prior to attaching lower section 60 to upper section 20, funnel 90 is seated within lower section 60. In the present embodiment of the invention, funnel 90 includes legs 92 that support funnel 90 within lower section 60 so that larger opening 93 of funnel 90 is at or near the top opening 63 of lower section 60. In alternate embodiments of the invention, funnel 90 may be seated within lower section 60 using any other known technique, e.g., by providing lower section 60 with an inwardly extending lip. In still further embodiments of the invention, funnel 90 may be more fixedly attached to lower section 60 after seating it within lower section 60, such as by utilizing clips, matching threads or any other known mechanism. However, such secure attachment generally is not necessary.

In the present embodiment, funnel 90 has a smooth upper surface (i.e., the surface adjacent to upper section 20) and a steep taper angle. Preferably, the taper angle is at least 35 degrees, and more preferably is at least 45 degrees, from horizontal. In the present embodiment, the angle is approximately 45 degrees. The conical portion of funnel 90 preferably has two sections, an upper section 98 and a lower section 99.

As further shown in FIG. 3, several optional funnel inserts 94 and 96 may be utilized to decrease in the diameter of lower opening 91. Essentially, inserts 94 and 96 are smaller funnels that match the taper of, and are seated within, funnel lower section 99 but extend further than opening 91, thereby resulting in a smaller effective diameter for opening 91. For example, insert 94 may reduce the diameter of opening 91 from 1 inch to ½ inch and insert 96 may reduce it to ¼ inch. Either or both of the inserts 94 or 96 can be seated in the lower portion 99 of funnel 90. However, if both inserts are used, the diameter will be the same as if only the smaller insert (e.g., 96 in the present example) were used. As will become apparent below, a particular diameter may be selected based upon the size of insects that one desires to capture.

In use, funnel 90 is placed into lower section 60 and, if desired, one or both of inserts 94 and 96 may be placed within funnel 90 in order to reduce the diameter of lower opening 91. The user ensures that light source 21 is installed into upper section 20. Then, lower section 60 is screwed into upper section 20, the entire device 10 is hung outside, power cord 28 is plugged into a power outlet, and power switch 29 is turned on. It is noted that insect trap 10 is intended primarily for use at night.

Many different types of insects will be attracted by light source 21. Some will enter upper section 20 through openings 26. Once inside, the combination of the light emitted from light source 21 and the light reflected off the inner surface of side walls 24 will tend to confuse an insect. As a result, the insect generally will remain inside of upper section 20 until it either gets tired and attempts to settle on the bottom of upper section 20 or collides with light source 21 or with the inner surface of side walls 24 and falls. In either case, owing to the smooth surface and steep taper angle of funnel 90, the insect will fall down through opening 91 into the enclosed lower section 60, provided that opening 91 (subject to any narrowing by using insert 94 and/or 96) is large enough to accommodate the insect. If, on the other hand, the insect is too large to pass through funnel 90, it will eventually recover, and likely will repeat the process until it is able to find its way out of upper section 20.

Once an insect has fallen into enclosed lower section 60, it generally will not be able to find the relatively small opening 91 (again, subject to any narrowing by using insert 94 and/or 96) in order to escape back into upper section 20. In particular, one advantage of using a transparent, substantially transparent, translucent or other optically transmissive funnel 90 is that light from light source 21 enters lower section 60 from the entire upper opening 63 of lower section 60. On the other hand, if an opaque funnel 90 were to be used, then light from light source 21 generally would only enter lower section 60 through opening 91, which would then tend to attract insects toward opening 91, thereby facilitating their escape from lower section 60.

Figure 5:
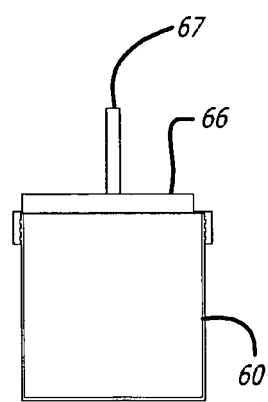
FIG. 5 is a front elevational view of the lower section of the live insect trap shown in FIGS. 1-4, detached from the remainder of the unit and with a cover attached.

After some period of use (e.g., in the morning), light source 21 is switched off, lower section 60 is unscrewed from upper section 20, and cover 66 is screwed onto lower section 60 (as shown in FIG. 5). Then, the captured insects can be transported within lower section 60 to any desired location.

Additional Considerations

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality may be ascribed to a particular module or component. However, unless any particular functionality is described above as being critical to the referenced module or component, functionality may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. An apparatus for capturing live insects comprising:
   (a) an upper section having side walls, a top cover, and plural openings in the side walls that are large enough to permit insects to enter;
   (b) an enclosed lower section;
   (c) a funnel between the upper section and the enclosed lower section, wherein the funnel has a wide opening adjacent to the upper section and tapers to a narrow opening within the lower section; and
   (d) a light source housed within the upper section,
   wherein the side walls of the upper section have an inner surface that is reflective.

2. An apparatus according to claim 1, wherein the inner surface of the side walls is white.

3. An apparatus for capturing live insects comprising:
   (a) an upper section having side walls, a top cover, and plural openings in the side walls that are large enough to permit insects to enter;
   (b) an enclosed lower section;
   (c) a funnel between the upper section and the enclosed lower section, wherein the funnel has a wide opening adjacent to the upper section and tapers to a narrow opening within the lower section; and
   (d) a light source housed within the upper section,
   wherein the upper section has an outer surface that is substantially entirely dark.

4. An apparatus for capturing live insects comprising:
   (a) an upper section having side walls, a top cover, and plural openings in the side walls that are large enough to permit insects to enter;
   (b) an enclosed lower section;
   (c) a funnel between the upper section and the enclosed lower section, wherein the funnel has a wide opening adjacent to the upper section and tapers to a narrow opening within the lower section; and
   (d) an ultraviolet light source housed within the upper section.

5. An apparatus according to claim 4, wherein the side walls of the upper section have an inner surface that is reflective.

6. An apparatus for capturing live insects comprising:
   (a) an upper section having side walls, a top cover, and plural openings in the side walls that are large enough to permit insects to enter;
   (b) an enclosed lower section;
   (c) a funnel between the upper section and the enclosed lower section, Wherein the funnel has a wide opening adjacent to the upper section and tapers to a narrow opening within the lower section; and
   (d) a light source housed within the upper section,
   wherein the openings cover approximately 30-40% of a total area that would be provided if the side walls were completely closed.

7. An apparatus according to claim 6, wherein the light source comprises an ultraviolet light.

8. An apparatus according to claim 6, wherein the side walls of the upper section have an inner surface that is reflective.

9. An apparatus for capturing live insects comprising:
   (a) an upper section having side walls, a top cover, and plural openings in the side walls that are large enough to permit insects to enter;
   (b) an enclosed lower section;
   (c) a funnel between the upper section and the enclosed lower section, wherein the funnel has a wide opening adjacent to the upper section and tapers to a narrow opening within the lower section;
   (d) a light source housed within the upper section; and
   (e) a removable funnel insert disposed within the funnel, restricting the narrow opening of the funnel to a smaller size.

10. An apparatus according to claim 1, wherein the openings in the side walls comprise vertical slots.

11. An apparatus according to claim 1, wherein the wide opening of the funnel forms substantially all of a bottom surface of the upper section when said apparatus is fully assembled.

12. An apparatus according to claim 1, wherein the enclosed lower section screws into the upper section.

13. An apparatus according to claim 1, wherein the light source is a fluorescent lamp.

14. An apparatus according to claim 1, further comprising a hanging means attached to the top cover for hanging said apparatus.

15. An apparatus according to claim 1, wherein the enclosed lower section is removable from the upper section.

16. An apparatus according to claim 15, wherein when the enclosed lower section is removed from the upper section the funnel remains covering the enclosed lower section.

17. An apparatus according to claim 1, wherein the funnel is seated within the enclosed lower section.

18. An apparatus according to claim 1, wherein the lower section is optically transmissive.

19. An apparatus according to claim 1, wherein the funnel is optically transmissive.

20. An apparatus according to claim 1, wherein the only passage between the upper section and the enclosed lower section is through the funnel.

21. An apparatus according to claim 1, wherein the funnel tapers at an angle of at least 45° from horizontal.

22. An apparatus for capturing live insects comprising:
(a) an upper section having side walls, a top cover, and plural openings in the side walls that are large enough to permit insects to enter;
(b) an enclosed lower section;
(c) a funnel between the upper section and the enclosed lower section, wherein the funnel has a wide opening adjacent to the upper section and tapers to a narrow opening within the lower section;
(d) a light source housed within the upper section; and
(e) a cover that attaches to the enclosed lower section when the enclosed lower section is removed from the upper section.

* * * * *